(12) United States Patent  
Fang et al.

(10) Patent No.: US 9,479,518 B1  
(45) Date of Patent: Oct. 25, 2016

(54) LOW FALSE POSITIVE BEHAVIORAL FRAUD DETECTION

(71) Applicant: EMC Corporation, Hopkinton, MA (US)

(72) Inventors: ChunSheng Fang, San Mateo, CA (US); Derek Lin, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 35 days.

(21) Appl. No.: 14/308,599

(22) Filed: Jun. 18, 2014

(51) Int. Cl.
*H04L 29/06* (2006.01)
*G06F 17/30* (2006.01)

(52) U.S. Cl.
CPC .............. *H04L 63/14* (2013.01); *G06F 17/30* (2013.01); *G06F 17/30528* (2013.01)

(58) Field of Classification Search
USPC .................................. 726/23; 707/737, 748
See application file for complete search history.

(56) References Cited

U.S. PATENT DOCUMENTS

| 9,189,623 | B1 | 11/2015 | Lin et al. | |
|---|---|---|---|---|
| 2003/0212520 | A1* | 11/2003 | Campos | G06F 17/30601 702/101 |
| 2014/0047544 | A1* | 2/2014 | Jakobsson | G06F 21/55 726/23 |
| 2014/0188895 | A1* | 7/2014 | Wang | G06F 17/30699 707/748 |

OTHER PUBLICATIONS

Paatero et al. Positive matrix factorization: A non-negative factor model with optimal utilization of error estimates of data values. Environmetrics, 5(2):111-126, 1994.
Zhou et al. Large-scale parallel collaborative filtering for the Netflix prize. In Algorithmic Aspects in Information and Management, pp. 337-348. Springer, 2008.
Langville et al. Initializations for the nonnegative ma- trix factorization. In Proceedings of the Twelfth ACM SIGKDD International Conference on Knowledge Discovery and Data Mining, pp. 23-26. Citeseer, 2006.
Bien et al. Hierarchical clustering with prototypes via minimax linkage. Journal of the American Statistical Association, 106(495):1075-1084, 2011.
http://en.wikipedia.org/wiki/K-d_tree. May 7, 2014.
Lindeberg et al. Scale-space for discrete signals, PAMI(12), No. 3, Mar. 1990, pp. 234-254.

* cited by examiner

*Primary Examiner* — Brandon Hoffman
*Assistant Examiner* — Samuel Ambaye
(74) *Attorney, Agent, or Firm* — Barry N. Young (57) ABSTRACT

Techniques to detect fraud through behavioral analysis with low false positives are disclosed. In various embodiments, resource access data indicating for each resource in a set of resources respective usage data for each of one or more users of the resource is received. Hierarchical clustering analysis is performed to determine at each of two or more hierarchical levels a set of one or more clusters of users, resources, or both. A level-specific anomaly score is computed at each of said two or more hierarchical levels. The level-specific anomaly scores are aggregated across said two or more hierarchical levels to determine an aggregate anomaly score. The aggregate anomaly score to determine whether an anomaly has been detected.

15 Claims, 5 Drawing Sheets

FIG. 5 ommitted for brevity...

LOW FALSE POSITIVE BEHAVIORAL FRAUD DETECTION

BACKGROUND OF THE INVENTION

Techniques have been disclosed to detect anomalous behavior, for example, insider threats in an enterprise computer network—anomalous resource access/action behavior by users; financial fraud in banking system—anomalous bank account access behavior by customers or fraudsters; etc. One example technique is to analyze a temporal behavior matrix per user, e.g., via subspace learning such as principal component analysis, to model normal behavior, and the model will be used in the future to detect as anomalous behavior that departs from the historical behavior baseline.

Behavior detected as being anomalous may require investigation or other responsive action. In some cases, a behavioral modeling approach to anomaly detection as described above may generate too many alerts to be investigated in a timely and effective manner, and/or potentially too many "false positives", i.e., identifying as anomalous behaviors that are not of concern, such as a user being observed to use for the first time a resource that is in a same group of resources as other resources the user has been observed to have accessed before.

Another challenge is the Big Data. A typical large enterprise has the scale of 100 Billions of events generated in the computer network per year. With such volume of data that cannot fit into one single machine for traditional in-memory analytics, we devise several algorithmic mechanism to parallelize the machine learning model training and scoring, in a parallel architecture such as MPP (Massively Parallel Processing), MR (Map Reduce).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to reduce false positive results in behavior modeling-based fraud and/or other anomaly detection approaches are disclosed. In various embodiments, clusters of users, resources, or other populations under consideration may be determined. Temporal behavior data may be analyzed at multiple levels, stated another way, multiple scales, within a clustering hierarchy to detect anomalies at different resolutions and/or scales. Respective results at multiple scales may be aggregated, and an aggregate score used to determine whether an anomaly has been detected.

In some embodiments, user access behavior with respect to resources in a set of resources may be analyzed. As used herein, in various embodiments the term "access behavior" may refer to any interconnected relationship between two entities. Examples include, without limitation, computer network user logon to a server to perform work, such as to read and/or delete data, a customer accessing financial bank accounts, etc.

Figure 1:
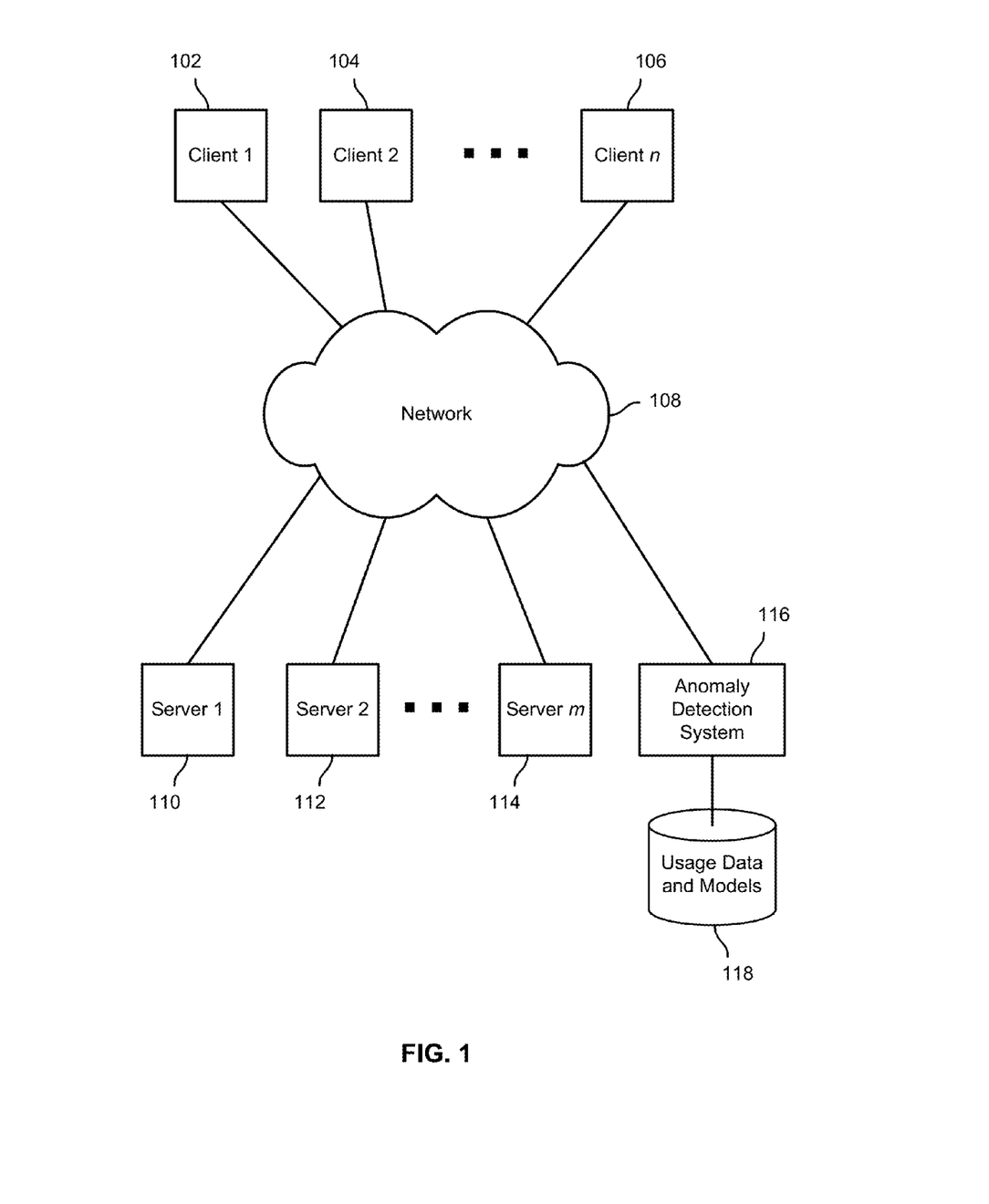
FIG. 1 is a block diagram illustrating an embodiment of a behavior-based anomaly detection system.

FIG. 1 is a block diagram illustrating an embodiment of a behavior-based anomaly detection system. In the example shown, a plurality of client systems, represented in FIG. 1 by client systems 102, 104, and 106, have access via a network 108 to a plurality of servers or other computing resources, represented in FIG. 1 by servers 110, 112, and 114. In some embodiments, servers such as servers 110, 112, and 114 may be enterprise servers made available to users of an enterprise network 108 to perform work-related functions, such as creating, storing, and accessing files or other stored objects; using server-based applications to perform enterprise-related tasks; etc.

Typically, users within an enterprise or other group of users will interact with only a subset of servers or other resources made available to enterprise (or other) users. For example, a given user's job function, department or other user group affiliation, and/or geographic and/or other network topographically relevant location may affect and/or determine a subset of resources with which that user interacts in the normal course of the user's work. Anomaly detection techniques may be used in various embodiments to detect anomalous interaction with resources by a user or group of users, such as suddenly accessing a resource the user has not been observed to have accessed in the past.

In the example shown in FIG. 1, an anomaly detection system 116 is provided. The anomaly detection system 116 receives and processed usage data stored in a usage data and model store (e.g., a database or other data store) 118 to generate and store in data store 118, for each user (and/or group of user) a model that defines and represents the user's "normal" interaction with the protected set of resources and which can be used to detect anomalous interactions with such resources.

In some embodiments, Microsoft® Active Directory and/or other login authentication information is received by anomaly detection system 116 and used to generate for each of a plurality of users a corresponding model of that user's access behavior with respect to a protected set of resources, such as the plurality of servers represented in FIG. 1 by servers 110, 112, and 114. In various embodiments, a temporal behavior matrix, e.g., reflecting a user's interaction with members of a protected set of servers or other resources during each of one or more periods, is created. At least a portion of the temporal behavior matrix may be used to generate a model of user behavior with respect to the resources, e.g., via subspace learning such as principal component analysis (PCA), k-nearest neighbor, and/or other analysis. The model may be used to detect anomalous user interaction with resources during a detection phase.

Refining temporal behavior based anomaly detection by determining and considering in anomaly detection analysis clusters of users and/or resources, e.g., at one or more levels of granularity, is disclosed. In various embodiments, clusters of resources may be determined, and behavior that might otherwise have been determined to be anomalous when considering (only) a user's own past behavior may be less likely to result in the behavior being determined by the system to be anomalous. For example, in various embodiments, a newly-observed interaction with a server that is in a same cluster of servers as one or more other servers with which the user has been observed to have interacted previously may be less likely to be identified as being anomalous. In some embodiments, a newly-observed interaction with a server that has been observed to have been interacted with previously by another user with which the interacting user is associated may be less likely to be identified as being anomalous. In some embodiments, individual PCA or other anomaly detection scores may be determined at multiple different levels of clustering, e.g., of resources, and an aggregate score determined based on the respective scores and the different levels, and a determination whether observed behavior is anomalous may be based on the aggregate score, as described more fully below.

While in the example shown in FIG. 1 the users/consumers of resources are represented by client systems 102, 104, and 106, in various embodiments anomaly detection may be performed with respect to resources users/consumers other than client computer systems. Likewise, while in the example shown in FIG. 1 the resources with respect to which anomaly detection is performed are computing resources, such as servers 110, 112, and 114, in various embodiments anomaly detection may be performed with respect to resources other than servers.

Figure 2:
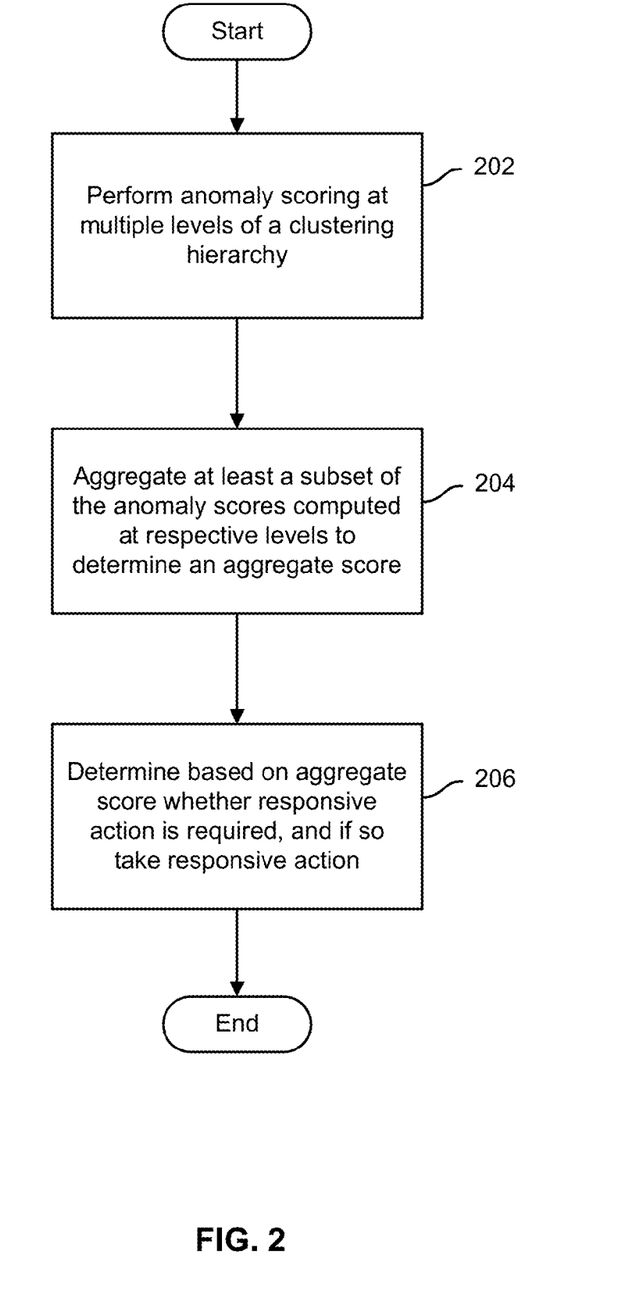
FIG. 2 is a flow chart illustrating an embodiment of a process to detect anomalous behavior.

FIG. 2 is a flow chart illustrating an embodiment of a process to detect anomalous behavior. In various embodiments, the process of FIG. 2 may be performed by an anomaly detection system, such as anomaly detection system 116 of FIG. 1. In the example shown, anomaly scoring is performed at multiple levels of clustering within a hierarchy (202). At a highest level in the hierarchy, for example, corresponding to a lowest level of granularity in analysis, all users and/or resources may be considered to comprise a single cluster, within which newly-observed behavior may not be considered, or may be less likely to be considered to be anomalous. At lower levels of clustering, new behaviors that result in a first time (for this user) interaction with a resource in a cluster of resources none of which that user has interacted with before, for example, may be identified (or be more likely to be identified) as anomalous, resulting in some embodiments in a higher PCA or other anomaly score at that level, for example. Anomaly scores for at least a subset of the respective levels for which scores where generated are aggregated to determine an aggregate score (204). For example, in some embodiments the respective score computed at various levels may be summed, or in some embodiments scores may be aggregated in some other way, e.g., weighted sum, weighted average, average or other statistical computation, addition of binary values reflecting for each level whether the score at that level exceeded a threshold, etc. The aggregate score is used to determine whether responsive action is required, and if so to take the required responsive action (206). Examples of responsive action may include, without limitation, generating an alert, sending an alert to an administrative, including an alert in a generated report, etc.

Figure 3:
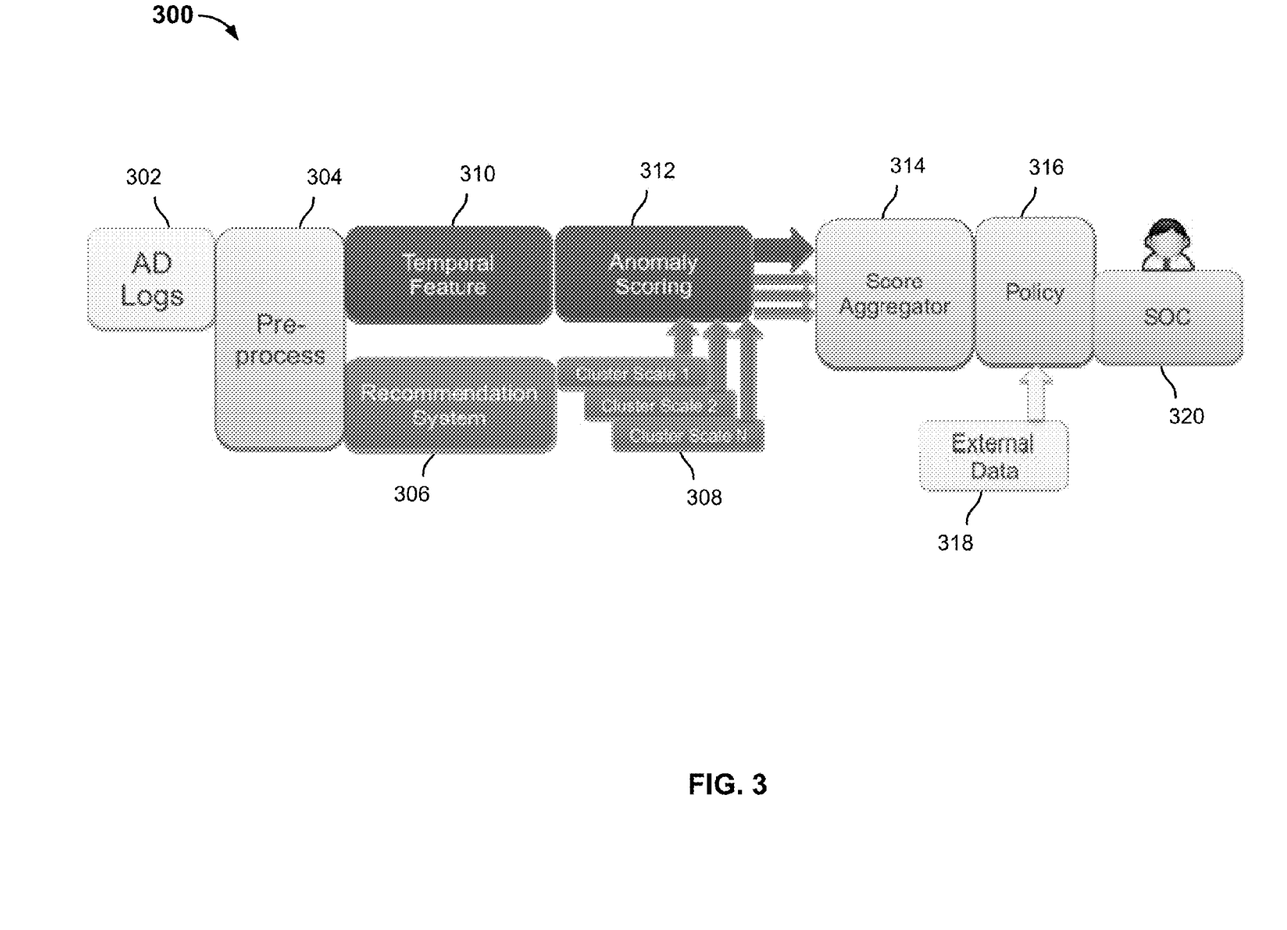
FIG. 3 is a block diagram illustrating an embodiment of a system and process to detect anomalous behavior.

FIG. 3 is a block diagram illustrating an embodiment of a system and process to detect anomalous behavior. In the example shown, an anomaly detection system 300 receives as input active directory or other login authentication logs 302 and pre-processes the log data to provide resource access data to a recommendation system or module 306 which uses the access data to determine clusters 308 at multiple, hierarchical levels; and to a temporal feature extraction module 310 which provides temporal behavioral matrix data to a PCA anomaly scoring module 312. The PCA anomaly scoring module 312 also receives as input the hierarchical cluster definitions 308 provided by recommendation system 306. For example, recommendation system 306 in various embodiments may determine one or more clusters of users based on observed commonality between those users, and/or one or more clusters of servers or other resources based on commonality observed with respect to the clustered resources, e.g., common users, etc. In various embodiments, PCA anomaly scoring module 312 determines a respective anomaly score, for example for a given user, at each of a plurality of levels of clustering 308, and provides for each respective cluster scale 308 a corresponding scale/level specific anomaly score. Score aggregator 314 uses the level/scale-specific scores to compute an aggregate score, which is provided to a policy engine 316. The policy engine uses the aggregate score, predefined policies, and in the example shown (optionally) external data (e.g., fraud and/or intrusion detection system events, etc.) to determine output data (e.g., alerts, reports, scores, etc.) to be provided to an administrative user, such as a network/resource security personnel, via a forensics and/or other analysis and/or reporting module 320.

Figure 4:
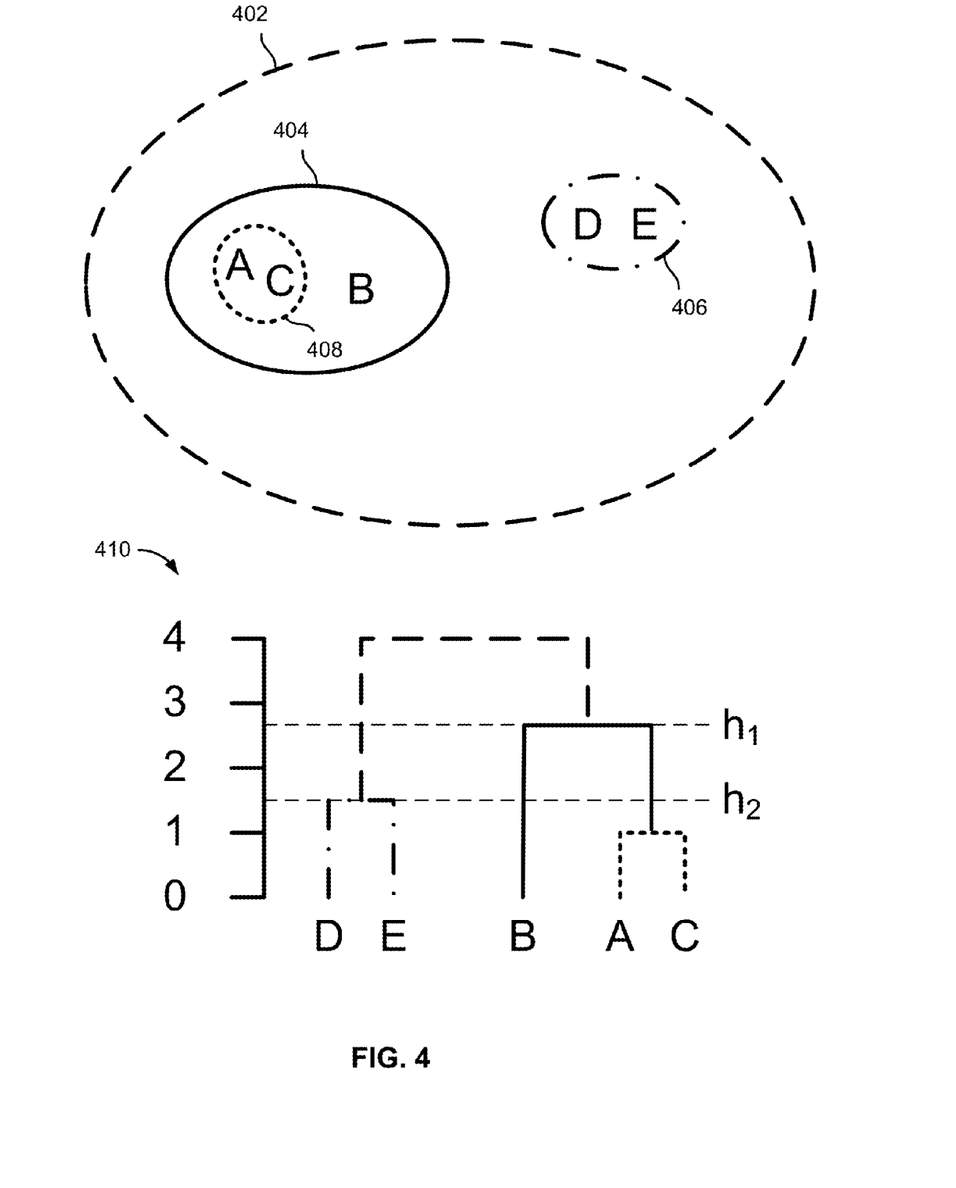
FIG. 4 is a block diagram illustrating an embodiment of a system and process to detect anomalous behavior.

FIG. 4 is a block diagram illustrating an embodiment of a system and process to detect anomalous behavior. In various embodiments, hierarchical cluster analysis is performed to determine clusters and multiple levels. Clusters at different levels are used to compute level-specific anomaly scores, which are aggregated to compute an aggregate score. In the example shown in FIG. 4, the entities A, B, C, D, and E reside in a feature space as shown. While in this example two dimensions are shown, in other embodiments three or more dimensions may be considered. In the example shown, at a highest level (lowest resolution) the five entities are in a single high level cluster 402. At a next level down, represented in dendogram 410 by the horizontal line labeled "h1", entities A, B, and C are in a first cluster 404 while entities D and E are in a second cluster 406. At a further level down, corresponding to the horizontal line labeled "h2" in dendogram 410, three clusters are determined, including entities A and C in cluster 408, entity B in its own cluster, and entities D and E in cluster 406. At the lowest level, each entity is in its own cluster. At the lowest level, in some embodiments any deviation by an entity by the entity's own behavior, or a user's deviation with respect to its access pattern with respect to an entity, may be identified as an anomaly. Conversely, at intermediate levels, such as levels corresponding to heights "h1" and "h2" in dendogram 410, deviations from normal behavior by or with respect to an entity may not be determined to be (or may not be scored as highly as) an anomaly if the deviation involves interaction with a resource in a same cluster as a previously used resource and/or use of a resource used previously by another user in the subject user's same cluster.

Figure 5:
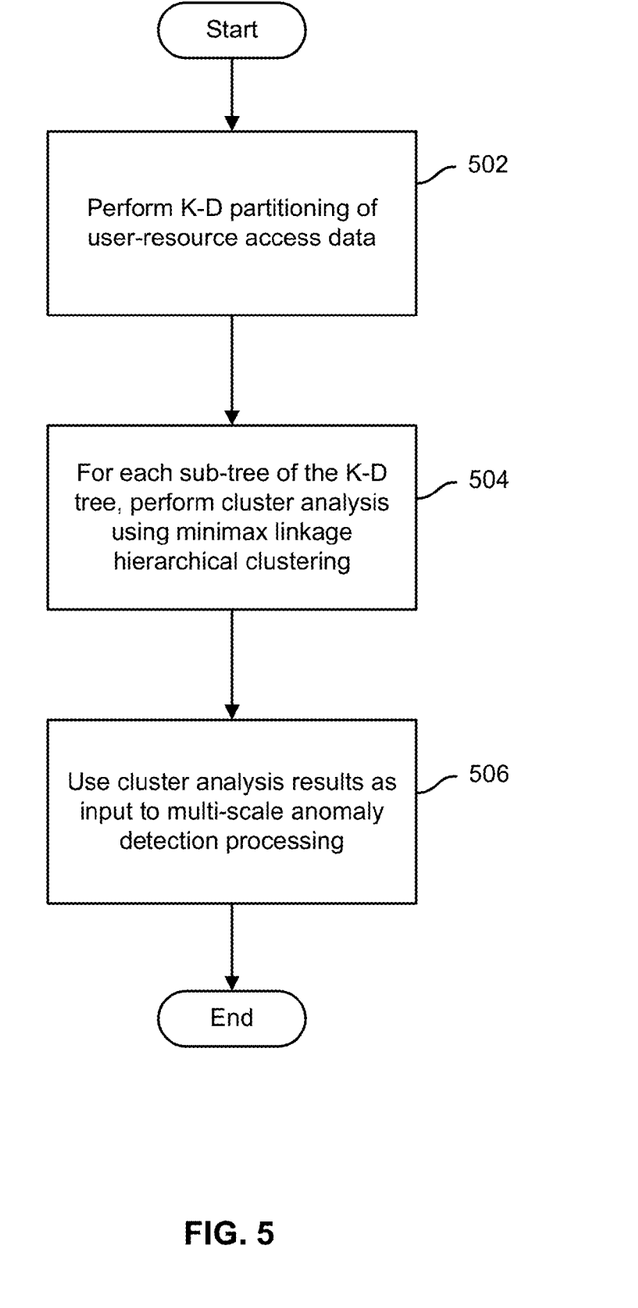
FIG. 5 is a flow chart illustrating an embodiment of a process to determine clusters to be used to detect anomalous behavior.

FIG. 5 is a flow chart illustrating an embodiment of a process to determine clusters to be used to detect anomalous behavior. In some embodiments, the process of FIG. 5 may be used to make more computationally efficient the process of performing hierarchical cluster analysis with respect to large data sets (e.g., large number of users and/or resources). In the example shown, K-D partitioning of user-resource access data (e.g., active directory statistics) is performed (502). K-D partitioning in various embodiments involves partitioning a very large data set into a plurality of subsets on which clustering analysis is to be performed. For each sub-tree of the resulting K-D tree, cluster analysis is performed, e.g., using minimax linkage hierarchical clustering or other analysis (504). The cluster analysis results are used as input to multi-scale anomaly detection processing, e.g., as disclosed herein (506).

In various embodiments, the recommendation system-based or other cluster processing described herein is performed at a periodicity determined by network security personnel to be appropriate for the needs of a given enterprise or other resource owner.

When training a machine learning model, the first place is to pick the good quality training set. Note that "Normal" is time-dependent: the first advent of a newly-added resource access is an anomaly, but when more access evidence is accumulated, access of the resource is transitioned to normal. In some embodiments, analysts mark true anomalies to exclude anomalies from training data in a timely manner, e.g., on a weekly basis.

In various embodiments, network security or other administrators decide the turnaround time for investigating the anomalous behaviors, taking into consideration the adaptive nature of the machine learning models. For example, if the fraudster's anomalous behaviors are not captured in about one month time frame, the anomalous behaviors will be part of the training set and will be considered as normal behavior in next reporting period. In various embodiments, a policy to review the anomalous users is defined. Once the anomalous behavior is investigated, if it is a malicious behavior, it is excluded from the training set; if the investigation shows that it is a false alarm, the behavior will be automatically merged into the training set of next report period.

In some embodiments the following schedule is used to generate models: PCA anomaly detection is run weekly; and Recommendation System (cluster definition) processing is performed monthly, or on demand when there is a network infrastructure significant change.

In various embodiments, a large scale, massively parallel (MPP) architecture is used to perform techniques disclosed herein. In some embodiments, a machine learning model as disclosed herein is implemented using a Pivotal Database (GPDB), as well as its Hadoop based MPP version, HAWQ (Hadoop With Query), in parallel. GPDB/HAWQ is compatible with PL/R, enabling data scientists to transplant and operationalize the R code that has been developed in a standalone research environment with minimal effort. The PL/R code, once deployed in GPDB, is run in parallel transparently by the MPP architecture in various embodiments.

In one example, anomaly detection using techniques disclosed herein was performed with respect to data having the following characteristics: 2+Billions of Windows AD and Unix Auth log records over 5 months; 180K+ users; and 17K+ server hosts after white-listing. In some embodiments, an MPP architecture having the following components, features, and/or characteristics may be used: Greenplum® Database 4.2; full rack DCA (Data Computing Appliance, manufactured by EMC® Greenplum®), about 200 CPU cores; and in the Database PL/R, PL/pgSQL (PL=Procedural Language, that enables in database programming with different languages such as R and PgSQL). On a standard laptop, it may take on the order of 1 second to train and predict a single user model. For 180K users, two days would be required. Using the MPP architecture described above, in one example only 55 seconds were needed to train and predict 180,210 users' anomaly scores.

In one example, the following forensic proof points were observed:
  Correlation with DLP (Data Loss Prevention) logs and among 10 top ranked users, got 2 users with 8 hits. (More likely Type 2)
  Correlation with EPO (AntiVirus) logs identified suspicious Autorun worm related user that was terminated but still active. (Type 1 and 2)

The following improvements on reducing false positives by integrating a Recommendation System as disclosed herein were observed in one example:
  SOC officers ran two searches through the DLP data, one with the model output generated with PCA only and one with PCA+RS.
  Of the top 15 users flagged by the PCA only model only 1 alarm was found in the DLP data.
  Of the top 15 users flagged by the PCA+RS model 8 alarms were found in the DLP data.
  Recommendation System suppresses False Positives and enforces the machine learning algorithm towards finding more anomalous behaviors.

In various embodiments, using hierarchical clustering as disclosed herein to determine anomaly scores at multiple levels in the cluster hierarchy and aggregate anomaly scores at multiple levels to make detection determinations may improve efficiency by reducing "false positive" anomaly detection results. For example, using techniques disclosed herein, changes in user access patterns that do not cross departmental or other organizational lines may be less likely to be detected as anomalies, potentially enabling human or other investigative resources to be focused on unexpected behaviors that deviate from "normal" across more levels of the cluster hierarchy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting anomalous behavior, comprising:
receiving resource access data indicating for each resource in a set of resources respective usage data for each of one or more users of the resource;
using a processor to perform hierarchical clustering analysis to determine at each of two or more hierarchical levels a set of one or more clusters of users, resources, or both, wherein using the processor to perform hierarchical clustering analysis includes performing a K-D partitioning of the resource access data to create a K-D tree, wherein using the processor to perform hierarchical clustering analysis further includes segmenting the K-D tree into a plurality of sub-trees, and performing a minimax linkage hierarchical clustering analysis of each sub-tree;
computing a level-specific anomaly score at each of said two or more hierarchical levels, wherein the level-specific anomaly score at each of said two or more hierarchical levels is based at least in part on anomalous behavior of the resource access data of a corresponding hierarchical level, wherein anomalous behavior of one of said two or more hierarchical levels is different than anomalous behavior of another of said two or more hierarchical levels;
aggregating the level-specific anomaly scores across said two or more hierarchical levels to determine an aggregate anomaly score; and
using the aggregate anomaly score to determine whether an anomaly has been detected.

2. The method of claim 1, wherein the resource access data comprises directory service data indicating which users have accessed which servers in a set of servers.

3. The method of claim 1, further comprising using the resource access data to build a temporal behavior matrix.

4. The method of claim 1, wherein aggregating the level-specific anomaly scores across said two or more hierarchical levels to determine an aggregate anomaly score comprises summing the level-specific anomaly scores.

5. The method of claim 1, wherein computing a level-specific anomaly score at each of said two or more hierarchical levels comprises computing a principal component analysis (PCA)-based anomaly score at each of said two or more hierarchical levels.

6. The method of claim 5, wherein computing a principal component analysis (PCA)-based anomaly score includes generating a PCA model based on a training period portion of the resource usage data and using the PCA model to detect anomalies in a subsequent test period portion of the resource usage data.

7. The method of claim 1, wherein computing a level-specific anomaly score at each of said two or more hierarchical levels includes computing the level-specific anomaly score in a manner that reflects access of a first resource by a user that has not been observed to have accessed the first resource previously in a first manner if the first resource is in a same cluster at that hierarchical level as a second resource the user has been observed to have accessed previously, and instead reflects access of the first resource in a second manner if the first resource is not in a same cluster at that hierarchical level as a second resource the user has been observed to have accessed previously.

8. The method of claim 1, wherein computing a level-specific anomaly score at each of said two or more hierarchical levels includes treating as non-anomalous an access of a first resource by a user that has not been observed to have accessed the first resource previously based at least in part on a determination that the first resource is in a same cluster at that hierarchical level as a second resource the user has been observed to have accessed previously.

9. A system to detect anomalous behavior, comprising:
a memory device; and
a processor coupled to the memory device and configured to:
receive resource access data indicating for each resource in a set of resources respective usage data for each of one or more users of the resource;
perform hierarchical clustering analysis to determine at each of two or more hierarchical levels a set of one or more clusters of users, resources, or both, wherein the processor is configured to perform hierarchical clustering analysis at least in part by performing a K-D partitioning of the resource access data to create a K-D tree, wherein the processor is further configured to segment the K-D tree into a plurality of sub-trees, and perform a minimax linkage hierarchical clustering analysis of each sub-tree;
compute and store in the memory a level-specific anomaly score at each of said two or more hierarchical levels, wherein the level-specific anomaly score at each of said two or more hierarchical levels is based at least in part on anomalous behavior of the resource access data of a corresponding hierarchical level, wherein anomalous behavior of one of said two or more hierarchical levels is different than anomalous behavior of another of said two or more hierarchical levels;
aggregate the level-specific anomaly scores across said two or more hierarchical levels to determine and store in the memory an aggregate anomaly score; and
use the aggregate anomaly score to determine whether an anomaly has been detected.

10. The system of claim 9, wherein the resource access data comprises directory service data indicating which users have accessed which servers in a set of servers.

11. The system of claim 9, wherein the processor is further configured to use the resource access data to build a temporal behavior matrix.

12. The system of claim 9, wherein the processor is configured to aggregate the level-specific anomaly scores across said two or more hierarchical levels to determine an aggregate anomaly score at least in part by summing the level-specific anomaly scores.

13. The system of claim 9, wherein the processor is configured to compute a level-specific anomaly score at each of said two or more hierarchical levels at least in part by computing the level-specific anomaly score in a manner that reflects access of a first resource by a user that has not been observed to have accessed the first resource previously in a first manner if the first resource is in a same cluster at that hierarchical level as a second resource the user has been observed to have accessed previously, and instead reflects access of the first resource in a second manner if the first resource is not in a same cluster at that hierarchical level as a second resource the user has been observed to have accessed previously.

14. The system of claim 9, wherein the processor is configured to compute a level-specific anomaly score at each of said two or more hierarchical levels at least in part by treating as non-anomalous an access of a first resource by a user that has not been observed to have accessed the first resource previously based at least in part on a determination that the first resource is in a same cluster at that hierarchical level as a second resource the user has been observed to have accessed previously.

15. A computer program product to detect anomalous behavior, the computer program product being embodied in a non-transitory computer readable storage medium and comprising computer instructions for:
- receiving resource access data indicating for each resource in a set of resources respective usage data for each of one or more users of the resource;
- performing hierarchical clustering analysis to determine at each of two or more hierarchical levels a set of one or more clusters of users, resources, or both;
- using the resource access data to build a temporal behavior matrix, including by performing a K-D partitioning of the resource access data to create a K-D tree, segmenting the K-D tree into a plurality of sub-trees, and performing a minimax linkage hierarchical clustering analysis of each sub-tree;
- computing a level-specific anomaly score at each of said two or more hierarchical levels, wherein the level-specific anomaly score at each of said two or more hierarchical levels is based at least in part on anomalous behavior of the resource access data of a corresponding hierarchical level, wherein anomalous behavior of one of said two or more hierarchical levels is different than anomalous behavior of another of said two or more hierarchical levels;
- aggregating the level-specific anomaly scores across said two or more hierarchical levels to determine an aggregate anomaly score; and
- using the aggregate anomaly score to determine whether an anomaly has been detected.

* * * * *